J. A. BERGREN.
GANG PLOW.
APPLICATION FILED JULY 29, 1920.
1,389,479.
Patented Aug. 30, 1921.
4 SHEETS—SHEET 4.
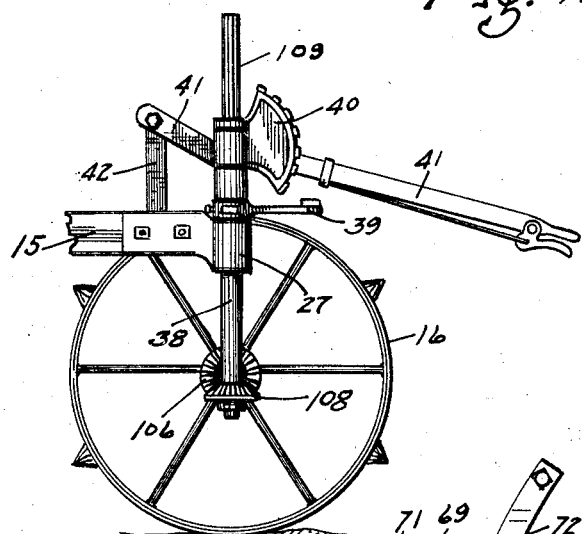
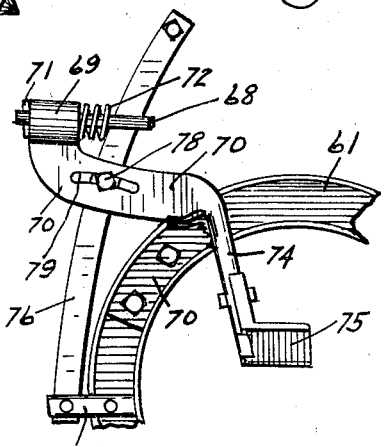
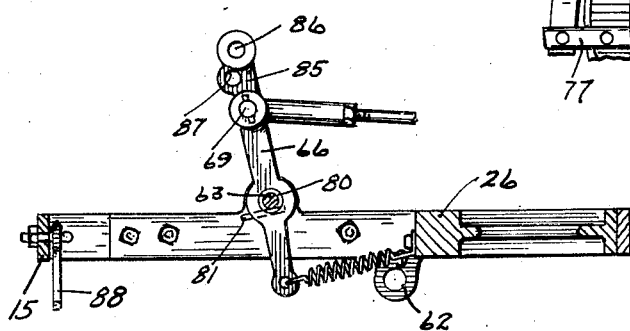
INVENTOR
John A. Bergren
BY HIS ATTORNEYS

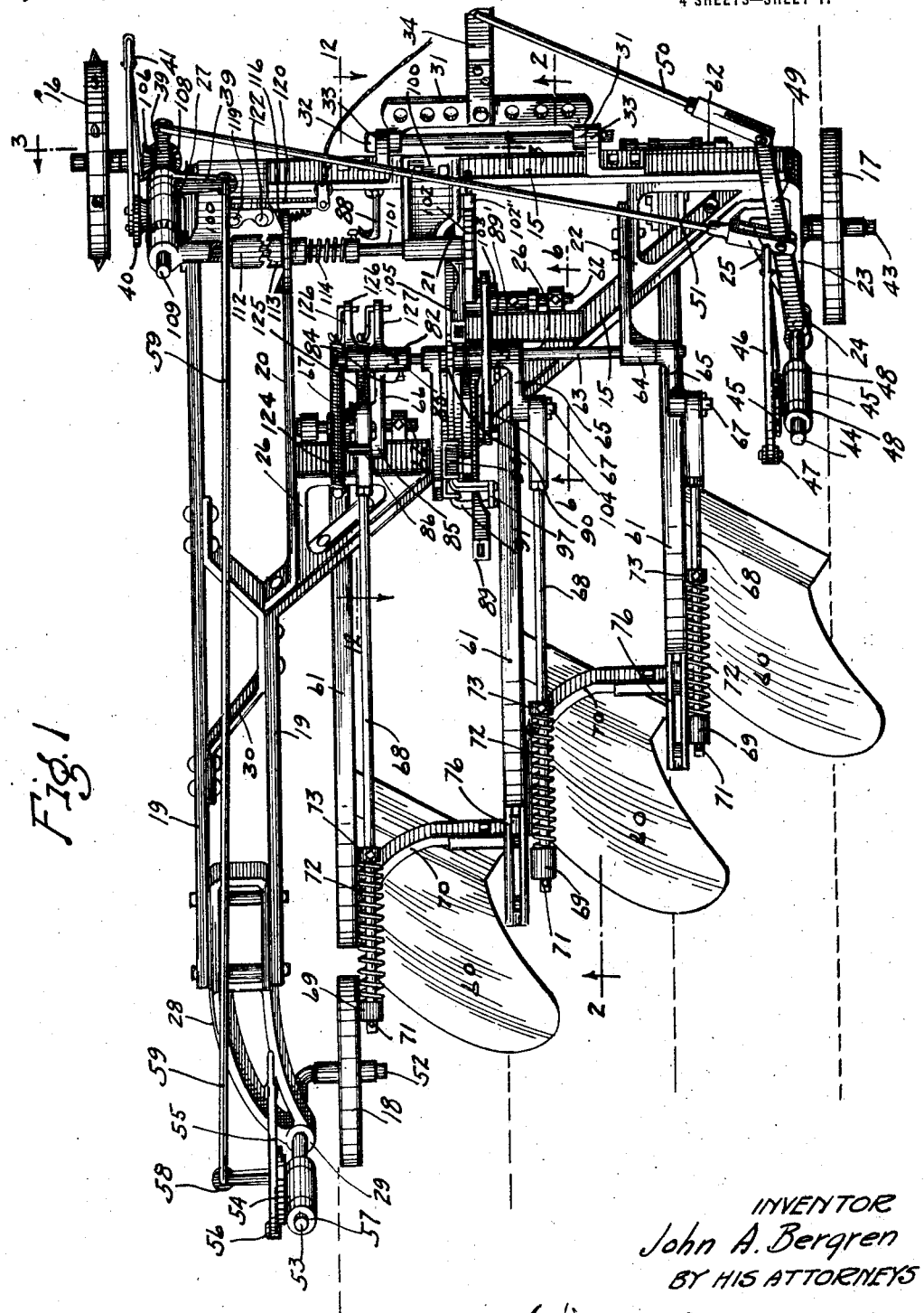

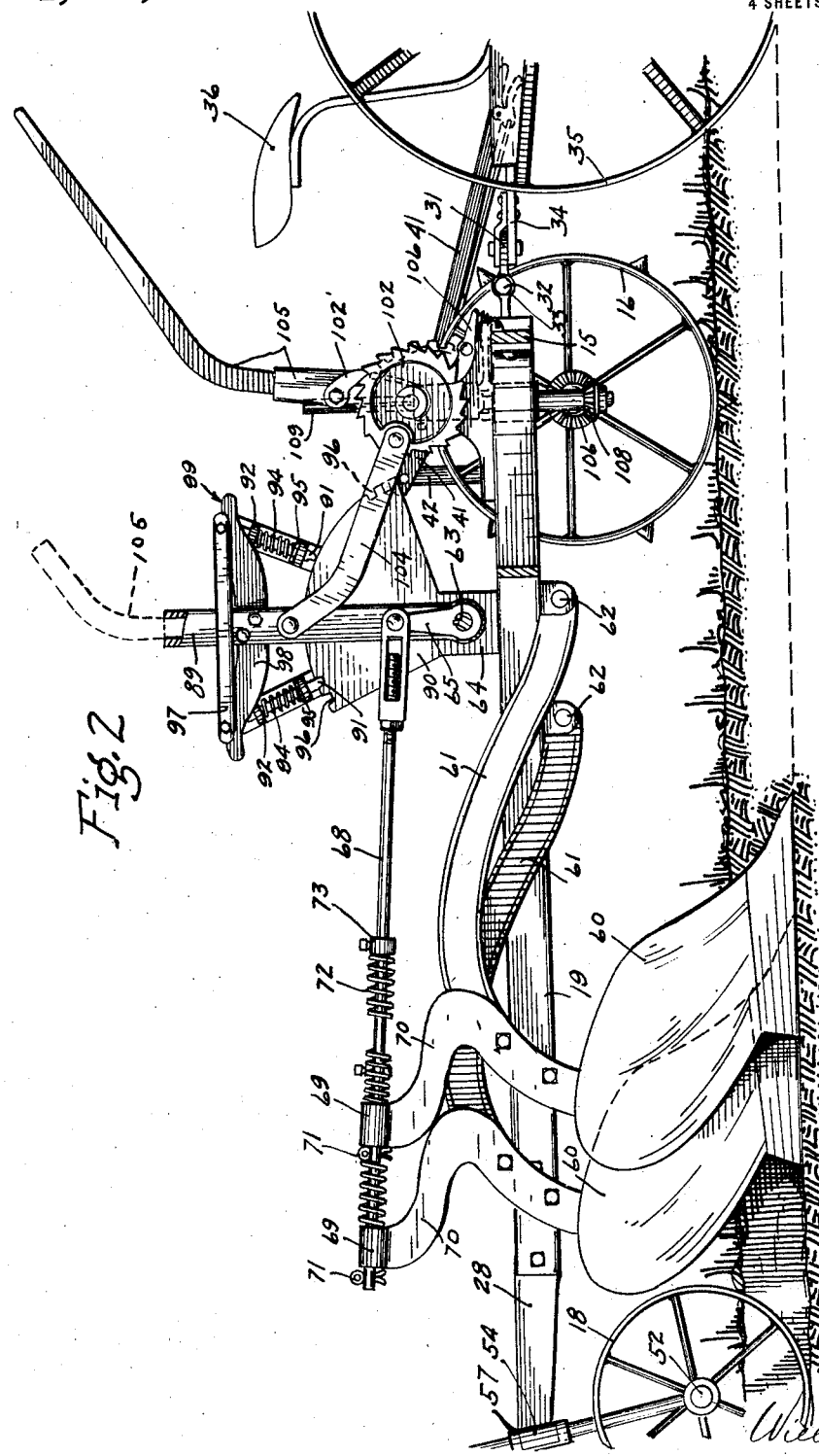

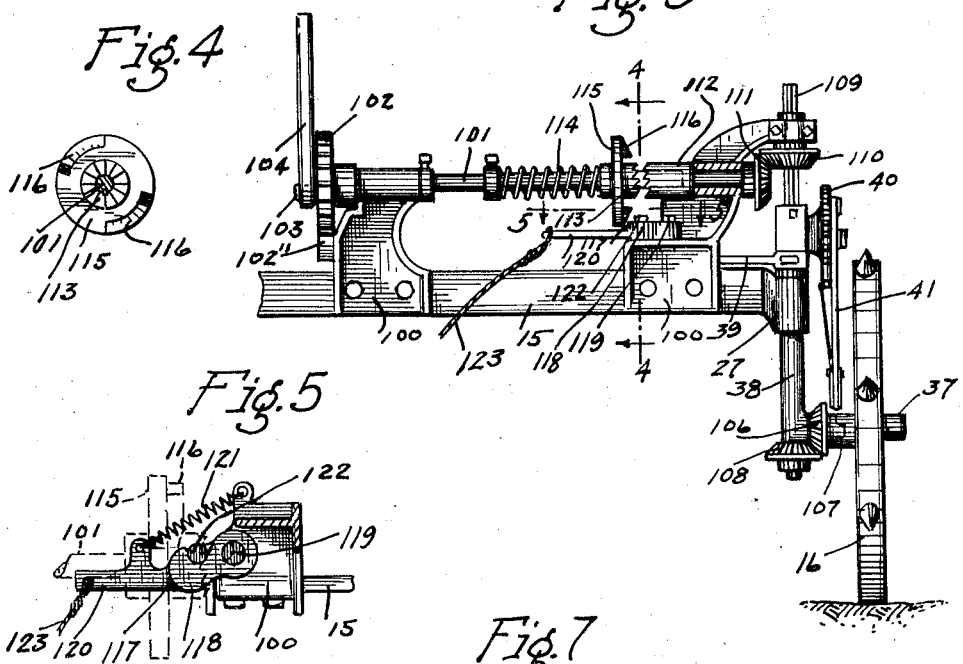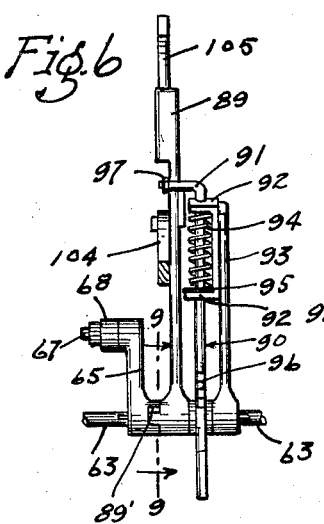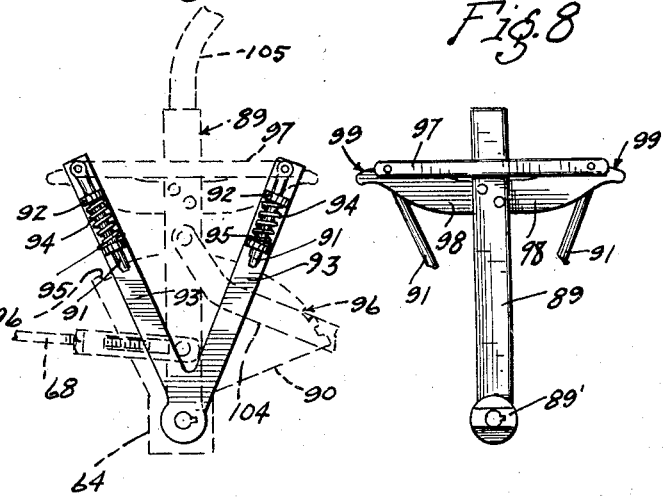

UNITED STATES PATENT OFFICE.

JOHN A. BERGREN, OF LAKE PARK, MINNESOTA.

GANG-PLOW.

1,389,479.  Specification of Letters Patent.  Patented Aug. 30, 1921.

Application filed July 29, 1920. Serial No. 399,850.

*To all whom it may concern:*

Be it known that I, JOHN A. BERGREN, a citizen of the United States, residing at Lake Park, in the county of Becker and State of Minnesota, have invented certain new and useful Improvements in Gang-Plows; and I do hereby declare the following to be a full, clear, and exact description of the invention, such as will enable others skilled in the art to which it appertains to make and use the same.

My present invention relates to improvements in gang plows, and to this end, it consists of the novel devices and combinations of devices hereinafter described and defined in the claims.

In the accompanying drawings, which illustrate the invention, like characters indicate like parts throughout the several views.

Referring to the drawings:—

Figure 1 is a plan view of the improved gang plow, looking at the same from the front and at an oblique angle of about forty-five degrees;

Fig. 2 is a view partly in right side elevation and partly in longitudinal vertical section, taken on the irregular line 2—2 of Fig. 1, and further illustrating a portion of the tractor to which the gang plow is attached;

Fig. 3 is a view partly in front elevation and partly in transverse section, taken on the line 3—3 of Fig. 1;

Fig. 4 is a detail view, with some parts sectioned on the line 4—4 of Fig. 3;

Fig. 5 is a detail view, with some parts sectioned on the line 5—5 of Fig. 3;

Fig. 6 is a detail view, with some parts sectioned on the line 6—6 of Fig. 1;

Fig. 7 is a left side elevation of the parts shown in Fig. 6, some of said parts being diagrammatically illustrated by means of broken lines;

Fig. 8 is a fragmentary detail view of the lever and its dog-releasing trips;

Fig. 9 is a detail view in transverse section, taken on the line 9—9 of Fig. 6, on an enlarged scale;

Fig. 10 is a fragmentary detail view of the plow guides and spacing devices.

Fig. 11 is an outside elevation of the front furrow wheel; and

Fig. 12 is a longitudinal vertical section taken on the line 12—12 of Fig. 1.

The plow truck includes a frame 15, a front land wheel 16, a front furrow wheel 17, and a rear furrow wheel 18. The truck frame 15, as shown, includes two bars bent to form an approximate triangle, and the sides of the triangle form the front end of the frame and the land side thereof. The two frame bars, at the land side, are extended rearward in parallel arrangement to form a frame extension 19. Two transversely spaced longitudinally extended tie-bars 20 and 21 rigidly connect the front and oblique rear members of the frame 15. The front and rear members of the frame 15 are further rigidly connected by a triangular casting 22 having an arm 23, which first extends transversely toward the furrow side of the frame and then rearward and has formed therein a vertically inclined bearing 24. This bearing 24 is further connected to the frame 15 by an oblique brace 25. Triangular castings 26 are interposed between the furrow sides of the tie-bars 20 and 21 and the rear member of the frame 15, are rigidly secured thereto and assist the casting 22 in holding the frame against angular twisting movement. These castings 22 and 26 also afford means for connecting the plow beams to the truck frame 15, as will presently appear.

Bolted to the land side of the frame 15 is a bearing bracket 27, and a casting 28 is interposed between the members of the frame extension 19 and rigidly bolted thereto. This casting 28 is extended rearward of the frame extension 19, toward the furrow side thereof, and is provided with a vertical bearing 29. The members of the frame extension 19, at their front ends, are further rigidly connected by a double brace 30.

A draft bar 31, having a plurality of transversely spaced perforations, is connected to the front member of the frame 15 for vertical swinging movement by a horizontal bolt 32 mounted in a pair of transversely spaced hinge lugs 33 bolted to said front member of the frame. A coupling bar 34 is pivoted to the draft bar 31 in one of its perforations and connects the gang plow to a tractor 35 having a seat 36 for an operator.

The land wheel 16 is loosely journaled on a trunnion 37 on the lower end of a tubular post 38 turnably and slidably mounted in the bearings 27. Keyed to the post 38, above the bearing 27, is a bell crank 39 provided for a purpose that will presently appear. For raising and lowering the frame 15, at the land wheel 16, there is provided a vertically disposed lock segment 40 and coöperating latch lever 41 intermediately fulcrumed to the hub of the lock segment 40 and having its short end connected by a link 42 to the bearing bracket 27. The hub of the lock segment 40 is turnably mounted on the upper end of the post 38 and rests on the hub of the bell crank 39 as a base of resistance.

The furrow wheel 17 is journaled on the trunnion 43, on the lower end of a post 44, turnably and slidably mounted in the bearing 24. To raise or lower the frame 15, at the furrow wheel 17, there is provided a vertically disposed lock segment 45 and coöperating latch lever 46 connected by a link 47 to the bearing bracket 24. The latch lever 46 is intermediately fulcrumed on the lock segment 45, the hub of which is turnably mounted on the post 44 and held against axial movement by a pair of collars 48 secured on said post. Rigidly secured to the post 44 is a forwardly projecting arm 49 connected by a longitudinally adjustable link 50 to the coupling bar 34. Obviously, the connections 49 and 50 will impart angular steering movement to the furrow wheel 17 from the coupling bar 34. The land wheel 16 is connected for common steering movement with the furrow wheel 17 by a longitudinally extensible link 51 pivoted to the intermediate portion of the arm 49 and to one of the arms of the bell crank 39.

The rear wheel 18 is journaled on a trunnion 52 on the lower end of a post 53 turnably and slidably mounted in the bearing 29, and to raise or lower this end of the frame 15, there is provided a lock segment 54 and coöperating latch lever 55 connected by a link 56 to the bearing 29. The hub of the lock segment 54 is turnably mounted on the post 53 and held against axial movement between two collars 57 secured on said post. To cause the rear wheel 18 to turn simultaneously with the wheels 16 and 17, there is formed with the lower collar 57 an arm 58 connected by a longitudinally extensible link 59 to the arm of the bell crank 39. If desired, the link 59 may be adjusted to set the rear wheel 18 at a slight angle in respect to the front wheel 16, so as to cause said wheel 18 to crowd against the lateral thrust produced by the plows.

The plows 60 have the customary beams 61 pivoted at 62 to and between depending lugs on the brackets 22 and 26. The plows 60 are raised and lowered by a rock-shaft 63 journaled in bearing brackets 64 having keyed thereto, for the two outside plows, a pair of crank arms 65, and for the inside plow, a crank arm 66 is loosely mounted on said shaft. The crank arms 65 and 66 have wrist pins 67, to which are pivoted the front ends of longitudinally extensible rods 68, the rear ends of which are mounted with freedom for endwise sliding movement in bearings 69 in the upper ends of upwardly and rearwardly projecting arms 70 bolted to the plow beams 61.

Cotter pins 71, in the rods 68, are arranged to engage the bearings 69 as stops to cause the rods 68, when pulled forward, to lift the plows 60. Coil springs 72, encircling the rods 68, are compressed between the bearings 69 and longitudinally adjustable collars 73 on said rods to permit the plows to lift by compressing these springs, in case they should strike a stone, stump or other obstruction. To connect the plows with freedom for independent lifting movement and, at the same time, hold the same properly spaced, the two inside arms 70 are provided with integrally formed transverse extensions 74, on the outer ends of which are bolted castings having forwardly projecting lugs 75. These lugs 75 project between pairs of connected laterally spaced guide bars 76, that extend on the arc of a curve having its center at, or approximately at, the pivotal connections 62 for the plow beams 61.

It will be noted that it is only necessary to provide the two outside plows with the guide bars 42, and which guide bars are pivoted to and between pairs of rearwardly projecting straps 77 bolted to the plow beams 61. The intermediate portions of the guide bars 76 intersect the arms 70 and are adjustably connected thereto with freedom for either forward or backward movement by bolts 78 secured to said guide arms and extending through segmental slots 79 in the arms 70. This adjustment of the guide bars 76 permits the same to be properly positioned in respect to the lugs 75.

As previously stated, the crank arm 66 is loosely mounted on the rock-shaft 63 and held against axial movement thereon by forming in said shaft an annular groove 80 to receive a pin 81 secured in the hub of said arm. To lock the crank arm 66 to the rock-shaft 63, the same is provided on its hub with a half-clutch 82 arranged to receive a coöperating half-clutch 83 slidably mounted on the rock-shaft 63 and adapted to be locked thereto by a set screw 84. On the free end of the crank arm 66 is an extension 85 having a wrist pin 86 and an eye 87 intermediately located between said wrist pin and the respective wrist pin 67.

In case it is desired to use only two plows, the inside plow may be held raised by moving the half-clutch 83 out of engagement with the half-clutch 82, drawing the crank arm 66 forward and inserting a hook 88, anchored to the front member of the frame 15, through the eye 87 in the crank arm extension 85. If it is desirable to hold the inside plow raised still higher, its rod 68 may be detached from the wrist pin 67 and attached to the wrist pin 86.

To oscillate the rock-shaft 63 and thereby raise the plows 60 either by hand or power, there is loosely pivoted on the rock-shaft 63 a lever 89 connected to a hub of the inner crank arm 65 by a clutch 89′, which indirectly connects said lever to the rock-shaft with freedom for slight circumferential movement thereon, for a purpose that will presently appear. The lever 89 may be adjustably held in either of its extreme positions by a lock segment 90 formed with the inside bearing 64 and a pair of one-way ratchet-acting lock dogs 91 mounted in upper and lower bearings 92 on a dog carrier in the form of a pair of radially extended arms 93 formed with a hub keyed to the rock-shaft 63. Coil springs 94, compressed between the upper lugs 92 and pins 95 in the lock dogs 91, yieldingly hold said lock dogs on the periphery of the lock segment 90 or in any one of two lock notches 96 in each extremity of the periphery of said lock segment. To prevent the lock dogs 91 from turning in the lugs 92, the same, as shown, are square in cross section and fit in correspondingly formed seats in said lugs. The lock dogs 91, at their upper extremities, are bent laterally and connected by a tie-bar 97, which is pivoted thereto, and it will be noted that the lever 89 works between said laterally bent ends. This tie-bar 97 permits independent endwise movement of the lock dogs and also assists in holding the same against turning movement.

To automatically release the lock dogs 91 from the seats 96, there is rigidly secured to the lever 89 trips in the form of a pair of oppositely projecting arms 98 having on their upper edges cam surfaces 99 arranged to engage the laterally bent ends of the lock dogs 91. When the lever 89 is moved forward to rock the shaft 63 and thereby lift the plows, the initial movement of said lever will be in respect to said rock-shaft and thereby cause the cam surface 99, on the rearwardly projecting arm 97, to engage the rear lock dog 91 and lift the same out of the engaged seat 96. After this initial movement of the lever 89 in respect to the rock-shaft 63, the clutch 89′ will lock the lever 89 to the rock-shaft 63 and the balance of the forward movement of said lever will carry the front lock dog 91 into a position to enter one of the seats 96 and thereby lock the plows raised. If it is desirable to lift the plows still farther, a continued forward movement of the lever 89 will cause the front lock dog 91 to cam itself out of the engaged seat 96 and enter the next seat.

To lower the raised plow, the initial rearward movement of the lever 89 will also be in respect to the rock-shaft 63 and thereby cause the cam surface 99, of the rearwardly projecting arm 97, to engage the front lock dog 91 and lift the same out of the engaged seat 96. The clutch 89′ will then become active to lock the lever 89 to the rock-shaft 63. The balance of the rearward movement of the lever 89 will lower the plow and allow the same to enter the ground. As the plows are entering the ground, the rear lock dog 91 will enter the foremost rear seat 96, and a further movement of said lever 89 in the same direction will cause said lock dog to cam itself out of the engaged seat 96 and enter the next seat 96, to lock the lever 89 against forward movement under the action of the plows.

For oscillating the lever 89 either by hand or power, to raise or lower the plows, there is journaled, in a pair of bearing brackets 100 secured to the front member of the frame 15, a driven shaft 101 having keyed to its outer end a ratchet wheel 102 having an eccentrically located wrist pin 103 connected by a link 104 to the intermediate portion of the lever 89. When the plows are in the ground, the wrist pin 103 is on a dead center, and by giving the ratchet wheel 102 a one-half rotation, the wrist pin 103 will be carried onto a dead center on the opposite side of the ratchet wheel, and which one-half rotation will raise the plows. Coöperating with the ratchet wheel 102, to rotate the shaft 101, there is provided a gravity-held dog 102′ pivoted to the lower section of a two-part hand lever 105. The lower section of this lever 105 is fulcrumed on the shaft 101 and held against axial movement between the outer bearing bracket 100 and the ratchet wheel 102. The upper section of the lever 105 is removably held in a socket formed in the upper end of the lower section of said lever. To prevent backward rotation of the shaft 101, there is pivoted to the outer bearing 100 a spring-held lock dog 106 arranged to engage the teeth of the ratchet wheel 102.

In the upper end of the lever 89 is a socket adapted to receive the upper section of the lever 105, and by which lever section, the rock-shaft 63 may be directly operated and caused to move very quickly. When the rock-shaft 63 is thus operated, it will, of course, be necessary to either separate the link 104 from the lever 89 or the wrist pin 103.

To operate the driven shaft 101 by power, there is mounted on the trunnion 37, for the front land wheel 16, a bevel gear 106 detachably interlocked by a clutch 107 to the inner end of the hub of said wheel. The purpose of thus connecting the gear 106 to the hub of the wheel 16 is to permit the same to be removed in case said gear is broken or wears out and a new one substituted therefor. The gear 106 meshes with a gear 108 secured to the lower end of a shaft 109, which extends axially through the tubular post 38. A gear 110 is connected to the upper end of the shaft 109 by a sliding key, whereby said shaft is free to move axially in said gear. The gear 110 is journaled in the inside bearing bracket 100 and meshes with a gear 111 journaled on the inner end of the shaft 101. On the outer end of the hub of the gear 111 is a one-way half-clutch 112. Coöperating with the half-clutch 112 is a one-way half-clutch 113 keyed to the shaft 101 for rotation therewith, but with freedom for axial sliding movement thereon. The half-clutch 113 is yieldingly held interlocked with the half-clutch 112 by a coil spring 114, which encircles the shaft 101 and is compressed between said half-clutch 113 and a longitudinally adjustable collar on said shaft. Secured to the half-clutch 113 is a disk 115 having on its inner face a pair of diametrically opposite cam lugs 116. Normally, the half-clutch 113 is held out of engagement with the half-clutch 112, so that the driven shaft 101 remains idle, by the engagement of one of the cam lugs 116 with the cam surface 117 on the trigger 118 pivoted on a stud 119 secured to the inside bearing bracket 100. The trigger 118 is provided with an arm extension 120 and a coil spring 121, secured to said extension and anchored to the inside bearing bracket 101, yieldingly holds the trigger 118 against a stop pin 122 on said bearing bracket and with its cam surface 117 in position to be engaged by the cam lugs 116, and, as previously stated, holds the half-clutch 113 released.

A cable 123 is attached to the arm extension 120 and tied to the support for the seat 36, where the same can be easily reached by an operator on said seat. If desired, housings may be provided for the gears 106, 108, 110 and 111. It will also be noted that the lever 105 is within easy reach of the operator on the seat 36.

To make the lifting of the plows a comparatively easy matter under manipulation of the lever 105, they are, in part, counterbalanced or lifted by a relatively strong coil spring 124 and a relatively light coil spring 125. The spring 124 is anchored to the inside casting 26 and attached to an arm 126 keyed to the inner end of the rock shaft 63. This spring 124 is designed to counterbalance the two outside plows and the spring 125 is designed to counterbalance the inside plow and is anchored to the inside casting 26 and to an arm extension 127 on the hub of the crank arm 66. Obviously, when the inside plow is held raised by the hook 88, the counterbalancing spring 125 is inactive.

Operation.

From the above description, it is evident that any one of the three corners of the frame 15 may be raised or lowered by manipulating the levers 41, 46 and 55. Simultaneous angular steering movement, as previously stated, is imparted to the wheels 16, 17 and 18 through the several connections to the coupling bar 34. By manipulating the lever 105, which extends within easy reach of the operator on the seat 36, step by step movement may be imparted to the ratchet wheel 102 for raising and lowering the plows. The initial movement of the ratchet wheel 102, through the link connection to the lever 89, automatically releases the lock dog 91, which is interlocked with one of the lock notches 96, and thereby releases the rock-shaft 63 so that the same may be oscillated to either raise or lower the plows.

If the operator wishes to operate the plows by power, he only needs to pull on the cable 123 to move the trigger 118 out of contact with the engaged cam lug 116 and allow the spring 114 to set the clutch 113 and thereby connect the shaft 101 to the front land wheel 16, which will turn the same through the several connections previously described. As soon as the operator releases the cable 123, the trigger 118 is returned to normal position by the spring 121, so as to be engaged by the next cam lug 116 to automatically disconnect the shaft 101 from the driving connections from the wheel 16 so as to impart only a one-half rotation to the shaft 101 to move the wrist pin 103 from one side of the ratchet wheel 102 to the other and thereby either raise or lower the plows.

While the lifting device, herein shown and broadly claimed, is especially adapted for use in connection with gang plows, it, of course, is well adapted for use in lifting or operating various different objects.

What I claim is:

1. In a gang plow, the combination with a truck frame, of a plurality of plows having their beams pivotally attached to the truck frame, plow-lifting devices including a rock-shaft, automatic locks for holding the rock-shaft with the plows either raised or lowered, and a lever for oscillating the rock-shaft and having automatic trips for releasing the automatic locks.

2. In a gang plow, the combination with a truck frame, of a plurality of plows having their beams pivotally attached to the truck frame, plow-lifting devices including a rock-shaft, automatic locks for holding the rock-shaft with the plows either raised or lowered, a lever for oscillating the rock-shaft and having automatic trips for releasing the automatic locks, a shaft, means for rotating the shaft, and crank-actuated connections from the shaft to the lever.

3. In a gang plow, the combination with a truck frame, of a plurality of plows having their beams pivotally attached to the truck frame, plow-lifting devices including a rock-shaft, automatic locks for holding the rock-shaft with the plows either raised or lowered, a lever for oscillating the rock-shaft and having automatic trips for releasing the automatic locks, a ratchet wheel, a link crank-connected to the ratchet wheel and attached to the lever, and a lever-actuated pawl for operating the ratchet wheel.

4. In a gang plow, the combination with a wheel-supported truck frame, of a plurality of plows having their beams pivotally attached to the truck frame, plow-lifting devices including a rock-shaft, automatic locks for holding the rock-shaft with the plows either raised or lowered, a lever for oscillating the rock-shaft and having automatic trips for releasing the automatic locks, a shaft, connections from the shaft to the lever for operating the same, means for driving the shaft from one of the truck wheels including a normally set clutch, and means for releasing the clutch.

5. In a gang plow, the combination with a wheel-supported truck frame, of a plurality of plows having their beams pivotally attached to the truck frame, plow-lifting devices including a rock-shaft, automatic locks for holding the rock-shaft with the plows either raised or lowered, a lever for oscillating the rock-shaft and having automatic trips for releasing the automatic locks, a shaft, connections from the shaft to the lever for operating the same, means for driving the shaft from one of the truck wheels including a clutch, yielding means under strain to set the clutch, and a trip for releasing the clutch.

6. In a gang plow, the combination with a wheel-supported truck frame, of a plurality of plows having their beams pivotally attached to the truck frame, plow-lifting devices including a rock-shaft, automatic locks for holding the rock-shaft with the plows either raised or lowered, a lever for oscillating the rock-shaft and having automatic trips for releasing the automatic locks, a shaft, connections from the shaft to the lever for operating the same, means for driving the shaft from one of the truck wheels including a clutch, yielding means under strain to set the clutch, a pair of circumferentially spaced cam lugs carried by the clutch, and a trip arranged to be engaged by either of the cam lugs to release the clutch at each one-half rotation of the driven shaft.

7. In a gang plow, the combination with a wheel-supported truck frame, of a plurality of plows having their beams pivotally attached to the truck frame, plow-lifting devices including a rock-shaft, automatic locks for holding the rock-shaft with the plows either raised or lowered, a lever for oscillating the rock-shaft and having automatic trips for releasing the automatic locks, a shaft, connections from the shaft to the lever for operating the same, means for driving the shaft from one of the truck wheels including a clutch, yielding means under strain to set the clutch, a pair of circumferentially spaced cam lugs carried by the clutch, a trip arranged to be engaged by either of the cam lugs to release the clutch at each one-half rotation of the driven shaft, and yielding means under strain to move the trip in the path of movement of the cam lugs.

8. A lifting device including a rock-shaft, a lock segment, having a group of lock notches at each extremity, a dog carrier on the rock-shaft arranged for alternate interlocking engagement with the lock notches, said lock dogs being arranged to move with a ratchet-like action from one lock notch to the other of each group, but held against movement toward the other of said groups, a lever for oscillating the rock-shaft and having a slight circumferential movement in respect thereto, and trips carried by the lever for alternately releasing the lock dogs from the lock notches during the circumferential movement of the lever in respect to the rock-shaft.

9. A lifting device including a rock-shaft, a lock segment, having a group of lock notches at each extremity, a dog carrier on the rock-shaft arranged for alternate interlocking engagement with the lock notches, said lock dogs being arranged to move with a ratchet-like action from one lock notch to the other of each group, but held against movement toward the other of said groups, a lever for oscillating the rock-shaft and having a slight circumferential movement in respect thereto, and a pair of oppositely extended arms on the levers having cam surfaces operative on the lock dogs for releasing the same from the lock notches during the circumferential movement of the lever in respect to the rock-shaft.

10. A lifting device including a rock-shaft, a lock segment, a dog carrier on the rock-shaft, two lock dogs on the dog carrier arranged for alternate interlocking engagement with the lock segment, a lever for oscillating the rock-shaft and having a slight circumferential movement in respect thereto, trips carried by the lever for alternately releasing the lock dogs from the lock segment during the circumferential movement of the lever in respect to the rock-shaft, a lever-actuated ratchet wheel, and a link crank-connected to the ratchet wheel and attached to the lever.

11. In a gang plow, the combination with a truck frame, a tubular post turnably mounted in the truck frame with freedom for endwise movement and having a trunnion, a wheel journaled on the trunnion, means for turning the post to impart angular steering movement to the wheel and means for raising and lowering the truck frame on the post, of a plow-lifting device including a shaft journaled in the post, means for driving the shaft in the post from the wheel, intermeshing bevel gears, one of which is keyed to the shaft in the post with freedom for sliding movement thereon, a clutch for connecting the other of said gears to the first noted shaft, and means for operating the clutch.

12. In a gang plow, the combination with a wheel-supported truck frame, of two plows having beams pivotally attached to the truck frame, a rock-shaft journaled on the frame, a fixed crank arm and a loose crank arm on the rock-shaft, plow-lifting rods connected to the rear portions of the plow beams, one of said rods being connected to the fixed crank arm and the other of said rods being connected to the loose crank arm for radial adjustment in respect to the rock-shaft, means for connecting the loose crank arm to the rock-shaft and disconnecting the same therefrom, at will, means for operating the rock-shaft, and two independent plow counterbalancing devices, one of which is operative on the rock-shaft and the other of which is operative on the loose crank arm.

13. In a gang plow, the combination with a wheel-supported truck frame, of two plows having beams pivotally attached to the truck frame, a rock-shaft journaled on the frame, a fixed crank arm and a loose crank arm on the rock-shaft, plow-lifting rods connected to the rear portions of the plow beams, one of said rods being connected to the fixed crank arm and the other of said rods being connected to the loose crank arm for radial adjustment in respect to the rock-shaft, means for connecting the loose crank arm to the rock-shaft and disconnecting the same therefrom, at will, means for operating the rock-shaft, two independent plow counterbalancing devices, one of which is operative on the rock-shaft and the other of which is operative on the loose crank arm, and means for securing the loose crank arm in a position, when released from the rock-shaft, to hold the respective plow raised.

In testimony whereof I affix my signature in presence of two witnesses.

JOHN A. BERGREN.

Witnesses:
A. F. YOUNGBERG,
NELS S. ANDERSON.